United States Patent
Shinomoto et al.

(10) Patent No.: US 8,823,303 B2
(45) Date of Patent: Sep. 2, 2014

(54) ALTERNATING-CURRENT DIRECT-CURRENT CONVERTER AND ELECTRIC MOTOR DRIVER

(75) Inventors: Yosuke Shinomoto, Chiyoda-ku (JP); Takuya Shimomugi, Chiyoda-ku (JP); Mitsuo Kashima, Chiyoda-ku (JP); Makoto Tanikawa, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 733 days.

(21) Appl. No.: 13/130,447

(22) PCT Filed: Dec. 1, 2008

(86) PCT No.: PCT/JP2008/071762
§ 371 (c)(1),
(2), (4) Date: May 20, 2011

(87) PCT Pub. No.: WO2010/064284
PCT Pub. Date: Jun. 10, 2010

(65) Prior Publication Data
US 2011/0227522 A1    Sep. 22, 2011

(51) Int. Cl.
*H02P 6/00* (2006.01)
*H02M 1/42* (2007.01)
*H02M 7/217* (2006.01)

(52) U.S. Cl.
CPC .......... *H02M 7/2176* (2013.01); *H02M 1/4225* (2013.01); *Y02B 70/126* (2013.01)
USPC .................................................... 318/400.29

(58) Field of Classification Search
CPC ............................ H02M 5/458; H02M 1/4208
USPC ..................................................... 318/400.29
See application file for complete search history.

(56) References Cited

U.S. PATENT DOCUMENTS 4,054,818 A * 10/1977 Risberg .......................... 318/807
6,556,462 B1 * 4/2003 Steigerwald et al. ........... 363/89

(Continued)

FOREIGN PATENT DOCUMENTS

CN    1379543 A    11/2002
EP    2 309 635 A1    4/2011

(Continued)

OTHER PUBLICATIONS

International Search Report (PCT/ISA/210) issued on Feb. 24, 2009, by Japanese Patent Office as the International Searching Authority for International Application No. PCT/JP2008/071762.

(Continued)

*Primary Examiner* — Erick Glass
(74) *Attorney, Agent, or Firm* — Buchanan Ingersoll & Rooney PC (57) ABSTRACT

Provided is an alternating-current direct-current converter capable of controlling a harmonic current and improving a power factor at reduced costs. The alternating-current direct-current converter includes two capacitors connected in series between output terminals of a rectifier; a first switch connected between one input terminal of the rectifier and a connection point of the capacitors; a second switch connected between the other input terminal of the rectifier and the connection point of the capacitors; a voltage detector which detects terminal voltages of the capacitors; a current detector which detects a current input from the alternating current power supply; and a control means which drives and controls the first switch and the second switch, in which the control means drives and controls the first switch and the second switch such that the terminal voltages of the capacitors are fixed and a power supply power factor is improved using an active power component and a reactive power component obtained by conversion of detection results of the current detector and detection results of voltage detector.

20 Claims, 6 Drawing Sheets

(56) References Cited

U.S. PATENT DOCUMENTS

| | | | |
|---|---|---|---|
| 7,274,579 B2* | 9/2007 | Ueda et al. | 363/125 |
| 7,646,165 B2* | 1/2010 | Ueda et al. | 318/801 |
| 2010/0014327 A1 | 1/2010 | Sakakibara | |
| 2012/0044728 A1* | 2/2012 | Yatsu et al. | 363/126 |

FOREIGN PATENT DOCUMENTS

| | | | |
|---|---|---|---|
| JP | 7-007946 A | 1/1995 | |
| JP | 7-89743 B2 | 9/1995 | |
| JP | 2000-125545 A | 4/2000 | |
| JP | 2001-211651 A | 8/2001 | |
| JP | 2004-129357 A | 4/2004 | |
| JP | 2005-110491 A | 4/2005 | |
| JP | 2008-022625 A | 1/2008 | |
| JP | 2008-099512 A | 4/2008 | |
| JP | 2008-172999 A | 7/2008 | |
| WO | 2008/026547 A1 | 3/2008 | |
| WO | WO 2009/028053 A1 | 3/2009 | |
| WO | WO 2010/013344 A1 | 2/2010 | |

OTHER PUBLICATIONS

Nobukazu Hoshi et al., "Harmonic Control Scheme Using Genetic Algorithm for Single-Phase Multi-Level Rectifiers", IEEJ Trans. IA, vol. 126, No. 1, 2006, pp. 88-89 (with partial English language translation).

Kubo et al., "Input Waveform Improvement of Single-Phase Converter by Multi-Level Voltage", Ibaraki University, National Conference of IEEJ, 1992, p. 5-30, The Institute of Electrical Engineers of Japan (IEEJ) (with partial English language translation).

Kuniomi Oguchi et al., "Proposal of a Multilevel-Voltage Source Type Rectifier Having a Three-Phase Diode Bridge Circuit as A Main Power Circuit", The Transactions of the Institute of Electrical Engineers of Japan, 1992, vol. 112-D, No. 5, pp. 497-498, The Institute of Electrical Engineers of Japan (IEEJ) (with partial English language translation).

Nobukazu Hoshi et al., "A Switching Pattern Decision Scheme for Single-Phase Multi-Level Rectifiers", 2005 Annual Conference of I.E.E. of Japan, Industry Applications Society, vol. 17, No. 1-61, pp. I-263 to I-264 (with partial English language translation).

Extended Search Report dated Apr. 3, 2013, issued in corresponding European Patent Application No. 08878546.4. (11 pages).

Kuniomi Oguchi et al., "A Novel Control Method for Single-Phase Slow Switching Multilevel Rectifiers", Conference Record of the 2002 IEEE Industry Applications Conference: 37th IAS Annual Meeting, Oct. 13, 2002, vol. 3, pp. 1966-1973.

Chinese Office Action dated Jun. 9, 2013, issued by the Chinese Patent Office in corresponding Chinese Application No. 200880132191. (16 pgs.).

Office Action (Notification of the Second Office Action) issued on Jan. 17, 2014, by the Chinese Patent Office in corresponding Chinese Patent Application No. 200880132191.X, and an English Translation of the Office Action. (21 pages).

"Input Waveform Improvement of Single-Phase Converter by Multi-Level Voltage", p. 5-30 (with partial English language translation).

Kuniomi Oguchi et al., "Proposal of a Multilevel-Voltage Source Type Rectifier Having a Three-Phase Diode Bridge Circuit as a Main Power Circuit", vol. 112, No, 5, pp. 497-498 (with partial English language translation).

Nobukazu Hoshi et al., "A Switching Pattern Decision Scheme for Single-Phase Multi-Level Rectifiers", 2005 Annual Conference of I.E.E. of Japan, Industry Applications Society, vol. 17, No. 1-61, pp. 1-263 to 1-264 (with partial English language translation).

Communication pursuant to Article 94(3) EPC dated May 2, 2014, issued by the European Patent Office in corresponding European Patent Application No. 08 878 546.4—1809. (6 pages).

* cited by examiner

ALTERNATING-CURRENT DIRECT-CURRENT CONVERTER AND ELECTRIC MOTOR DRIVER

TECHNICAL FIELD

The present invention relates to a device which converts an alternating current into a direct current.

BACKGROUND ART

Regarding a rectification power supply circuit, there has been proposed "a rectification power supply circuit including: a rectifier which rectifies an alternating current voltage and outputs a direct current voltage; a reactor connected in series to an alternating current input side or a direct current output side of the rectifier; a capacitor to which the direct current voltage output from the rectifier or the direct current voltage output via the reactor is applied via a diode, the capacitor acquiring a smoothed direct current voltage; a switch element which establishes a short circuit at a direct current output side of the rectifier directly or via the reactor; a voltage control means which outputs a voltage control signal in accordance with a deviation value between a voltage reference and the direct current voltage smoothed by the capacitor; a current reference calculating means which calculates a product of a sinusoidal synchronization signal in synchronization with the alternating current voltage or a sinusoidal full-wave rectification synchronization signal and the voltage control signal, and outputs a current reference signal; and a comparison means which compares the current reference signal and an alternating current side current or a direct current side current of the rectifier and outputs a driving signal for ON/OFF control of the switch element, in which the direct current output voltage is controlled to a desired value while controlling an alternating current input current in a sinusoidal form" (Patent Document 1).

Regarding an alternating-current direct-current converter, as a technique for solving a problem that "in a configuration in which a full-wave rectifier circuit formed using a single-phase alternating current power supply and a diode, a reactor, a capacitor series circuit, a bidirectional switch and a load are connected together, the voltage of the capacitor connected in series becomes nonuniform during a half cycle when the power factor of an alternating current input current is improved by switching of a bidirectional switch," it has been proposed that "in a configuration in which a reactor is connected between a single-phase alternating current power supply and one alternating current input of a full-wave rectifier circuit formed using a diode, a capacitor series circuit is connected between direct current outputs of the full-wave rectifier circuit, bidirectional switches 10 and 11 are connected between an internal connection point of the capacitor series circuit and each alternating current input of the full-wave rectifier circuit, and a load 14 is connected in parallel with the capacitor series circuit, voltages of a capacitor 12 and a capacitor 13 which are connected in series are detected and the bidirectional switches 10 and 11 are subject to ON/OFF control at a high frequency such that the detected voltages become uniform" (Patent Document 2).

As a technique for the purpose of "obtaining a direct current power supply unit capable of reducing harmonic components of an input current and optimumly improving a power factor," it has been proposed that "when an alternating current voltage of an alternating current power supply passes through a zero point, the switching means is operated to close after a predetermined first delay time has elapsed from the time of passage and the switching means is operated to open after a predetermined second delay time has elapsed from the time of passage" (Patent Document 3).

As a technique for the purpose of "reducing a control process speed, improving a power factor, reducing a harmonic and reducing costs through the reduction of the number of switching events to the minimum that is necessary," the following has been proposed "the inclusion of a rectifier circuit 2 which rectifies a voltage of an alternating current power supply 1; a smoothing capacitor 4 which smoothes an output voltage from the rectifier circuit 2; a switching means 6 disposed further toward the alternating current power supply 1 than the smoothing capacitor 4; a reactor 3 disposed further toward a power supply than the switching means 6; a load quantity detection means 10 which detects a load quantity of a load connected in parallel with the smoothing capacitor 4; and a control means 8 which controls opening and closing of the switching means at opening and closing time in accordance with the load quantity at least twice during a half cycle of the power supply in synchronization with the alternating current power supply 1" (Patent Document 4).

As a technique for the purpose of "enabling, in a converter circuit which converts an output voltage of an alternating current power supply 1, a voltage greater than an input voltage to be generated without using a reactor or a large capacitance capacitor," it has been proposed that "in a converter circuit 100 which converts an output voltage of an alternating current power supply 1, a rectifier circuit 20 which rectifies the output voltage of the alternating current power supply 1; first and second capacitors 31, and 32 connected in series which smooth an output of the rectifier circuit 20; and a switching circuit 40 which switches connections between the capacitors 31 and 32 and the alternating current power supply such that the output voltage of the alternating current power supply 1 is alternately applied to the first and second capacitors 31 and 32 repeatedly in a cycle shorter than that of the alternating current power supply, are included" (Patent Document 5).

As a technique for the purpose of "providing an electric power unit capable of satisfying a regulation on a power supply harmonic and providing both boost performance of an electric power unit and an input power factor at high levels," there has been proposed providing of "an electric power unit including: a rectifier circuit; a capacitor circuit which is formed using a plurality of capacitors connected in series, and is connected between two output terminals of the rectifier circuit; a first switching means connected between one input terminal of a rectifier circuit and one connection point between the capacitors in the capacitor circuit; a second switching means connected between the other input terminal of the rectifier circuit and one connection point between the capacitors in the capacitor circuit; and a zero crossing detection means which detects a zero crossing point of an alternating current power supply, in which for each half cycle of the alternating current power supply, both the first and second switching means are turned ON for a predetermined time t1 after the zero crossing point of the alternating current power supply, then only the second switching means is turned OFF for a predetermined time t2 and, thereafter, the first and second switching means 8 are turned OFF" (Patent Document 6).

A technique to control a harmonic current through an operation of two switching elements has also been proposed (Nonpatent Document 1).

[Patent Document 1] Japanese Examined Patent Application Publication No. 7-89743 (Abstract)

[Patent Document 2] Japanese Unexamined Patent Application Publication No. 2008-22625 (Abstract)

[Patent Document 3] Japanese Unexamined Patent Application Publication No. 7-7946 (Abstract)

[Patent Document 4] Japanese Unexamined Patent Application Publication No. 2000-125545 (Abstract)

[Patent Document 5] Japanese Unexamined Patent Application Publication No. 2005-110491 (Abstract)

[Patent Document 8] Japanese Unexamined Patent Application Publication No, 2008-99512 (Abstract)

[Nonpatent Document 1] Shinichi Hoshi, Oguchi Kuniomi, "A Switching Pattern Decision Scheme for Single-phase Multi-level Rectifiers" (2005 Annual Conference of I.E.E. of Japan, Industry Applications Society) No. 1-61

DISCLOSURE OF INVENTION

Problems to be Solved by the Invention

Although the technique described in above Patent Document 1 is capable of controlling harmonics, since it is current control in which an instantaneous value of an input current is detected and made to be sinusoidal instantaneously, high-speed control processing is required and therefore high frequency PWM control is required. Since the high frequency PWM control produces a lot of noises, the cost of addressing the problem of the noises increases.

Since analog control is performed using a high performance microcomputer and a dedicated IC (integrated circuit) for the high-speed control processing, the peripheral circuit configuration becomes complicated and thus the circuit cost increases.

Although the technique described in above Patent Document 2 performs high frequency PWM control similar to that of Patent Document 1 using two bidirectional switches, it has the same problem as that of Patent Document 1 because an instantaneous value of the input current is detected for the control.

With the technique described in above Patent Document 3, there is a problem that the reactor is increased in size in an attempt to control the harmonic current to below a regulated value.

With the technique described in above Patent Document 4, a more compact reactor can be provided without any change in performance of controlling harmonics. However, there is a problem of increased power consumption due to the increased number of switching events. There is also a problem that a larger reactor is required for a certain inductance value when the input current is increased.

With the technique described in above Patent Document 5, a capacitor of smaller capacitance can be provided by performing complementary switching at a frequency higher than the power supply frequency. However, since it is complementary switching for reducing the capacitance of the capacitor, it is difficult to reduce the power supply harmonic current sufficiently.

With the technique described in above Patent Document 6, the input power factor can be improved but it is difficult to provide a sufficiently compact reactor.

The technique described in above Nonpatent Document 1 obtains ON/OFF timing of the switching means using GA (genetic algorithm) in advance.

However, since GA requires calculation that takes a long time to obtain the optimal solution, it is necessary to store in advance, in a storage unit, each of parameters obtained through a calculation.

Accordingly, the technique requires long time to be developed for an application to a product with multiple models and also requires large capacitance for the storage of each of the parameters.

The present invention has been made in order to solve the above-described problems and an object thereof is to provide an alternating-current direct-current converter capable of controlling a harmonic current and improving a power factor with reduced costs.

Means for Solving the Problems

An alternating-current direct-current converter according to the present invention includes: a rectifier connected to an alternating current power supply via a reactor; two capacitors connected in series between output terminals of the rectifier; a first switch connected between one input terminal of the rectifier and a connection point of the capacitors; a second switch connected between the other input terminal of the rectifier and the connection point of the capacitors; diodes inversely parallelly connected with the capacitors; a voltage detector which detects terminal voltages of the capacitors; a current detector which detects a current input from the alternating current power supply; and control means which drives and controls the first switch and the second switch, in which the control means drives and controls the first switch and the second switch such that the terminal voltages of the capacitors are fixed and a power supply power factor is improved.

Advantages

According to the alternating-current direct-current converter according to the present invention, a three-level converter voltage can be output under control on time width and a sinusoidal converter voltage can be output through the control of ON/OFF timing of the first switching means and the second switching means.

With this, since the current flowing through the reactor can be controlled in a sinusoidal form, a power factor can be improved and a more compact reactor can be provided.

In addition, since the three-level converter voltage is output under control on time width, a switching operation can be performed at a low frequency, whereby a cost of addressing a problem of a high frequency noise can be reduced and a practical application can be achieved at reduced costs.

REFERENCE NUMERALS 1 alternating current power supply
2 rectifier
3 first switching means
4 second switching means
5 reactor
6 first capacitor
7 second capacitor
8 load
10 first diode
11 second diode
14 second rectifier
20 control means
21 voltage detector
22 current detector
23 power supply zero crossing detector
24 inverter control means
25 CPU

BEST MODES FOR CARRYING OUT THE INVENTION

Embodiment 1

Figure 1:
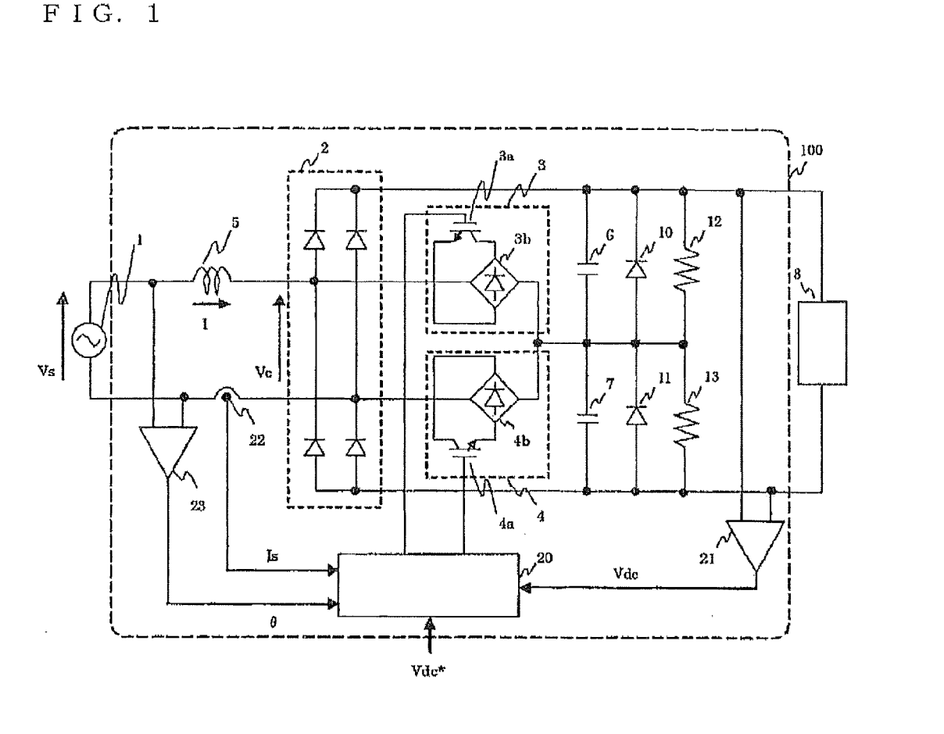
FIG. 1 is a circuit diagram of an alternating-current direct-current converter 100 according to Embodiment 1.

FIG. 1 is a circuit diagram of an alternating-current direct-current converter 100 according to Embodiment 1 of the present invention.

The circuit illustrated in FIG. 1 includes an alternating current power supply 1, a rectifier 2, a first switching means 3, a second switching means 4, a reactor 5, a first capacitor 6, a second capacitor 7, a direct current load 8, a first diode 10, a second diode 11, a first resistance 12, a second resistance 13, a control means 20, a voltage detector 21, a current detector 22 and a power supply zero crossing detector 23.

The alternating current power supply 1 supplies alternating current power from the outside of the alternating-current direct-current converter 100.

The rectifier 2 rectifies the alternating current power of the alternating current power supply 1 into direct current power.

One end of the first switching means 3 is connected to one input terminal of the rectifier 2 and the other end thereof is connected to a connection point of the first capacitor 6 and the second capacitor 7.

One end of the second switching means 4 is connected to the other input terminal of the rectifier 2 and the other end thereof is connected to a connection point of the first capacitor 6 and the second capacitor 7.

The reactor 5 is connected between the alternating current power supply 1 and the first switching means 3 or the second switching means 4 and has a function of controlling a harmonic current.

The first capacitor 6 is connected to one output terminal of the rectifier 2.

The second capacitor 7 is connected to the other output terminal of the rectifier 2.

The direct current load 8 is connected to an output of the rectifier 2.

The first diode 10 is connected in parallel with the first capacitor 6 and the second diode 11 is connected in parallel with the second capacitor 7.

The first resistance 12 is connected in parallel with the first capacitor 6 and the second resistance 13 is connected in parallel with the second capacitor 7.

The first diode 10 and the second diode 11 have a polarity which is opposite to that of the first capacitor 6 and the second capacitor 7, and thus are connected in a so-called inversely parallel state.

The first switching means 3 is, for example, a bidirectional switching means formed using an IGBT (insulated gate bipolar transistor) 3a and a diode rectifier 3b.

Similarly, the second switching means 4 is a bidirectional switching means formed using an IGBT 4a and a diode rectifier 4b.

The control means 20 drives and controls the, first switching means 3 and the second switching means 4.

The control means 20 may be formed using hardware, such as a circuit device that implements the function or, alternatively, may be formed using an arithmetic unit, such as a microcomputer or a CPU (central processing unit) and software which defines an operation of the arithmetic unit.

The voltage detector 21 detects the output terminal voltage of the rectifier 2 and outputs detection results to the control means 20.

The current detector 22 detects the instantaneous value Is of an input current which is input to the alternating-current direct-current converter 100 from the alternating current power supply 1 and outputs detection results to the control means 20.

The power supply zero crossing detector 23 detects a power supply phase θ and outputs detection results to the control means 20.

The configuration of the alternating-current direct-current converter 100 according to Embodiment 1 has been described above.

Next, an operation of the alternating-current direct-current converter 100 according to Embodiment 1 will be described.

Figure 2:
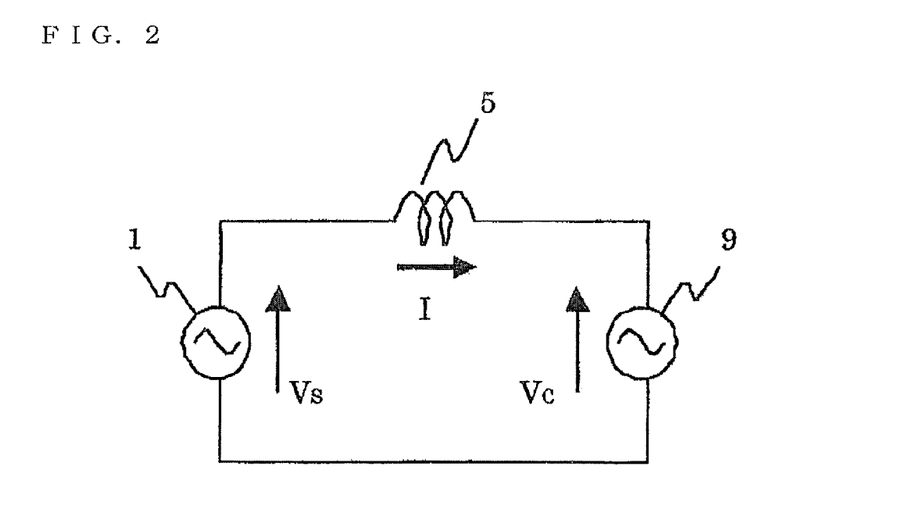
FIG. 2 is an equivalent circuit diagram illustrating an operation of the alternating-current direct-current converter 100.

FIG. 2 is an equivalent circuit diagram illustrating an operation of the alternating-current direct-current converter 100.

The operation of the alternating-current direct-current converter 100 can be considered as being equivalent to that of a virtual alternating current power supply 9 illustrated in FIG. 2 connected in series with the reactor 5. In particular, the first switching means 3 and the second switching means 4 operate such that the alternating-current direct-current converter 100 is equivalent to the virtual alternating current power supply 9.

Next, an operation of the virtual alternating current power supply 9 will be described.

A current I flowing through the reactor 5 is defined by a voltage difference between the alternating current power supply 1 and the virtual alternating current power supply 9.

Figure 3:
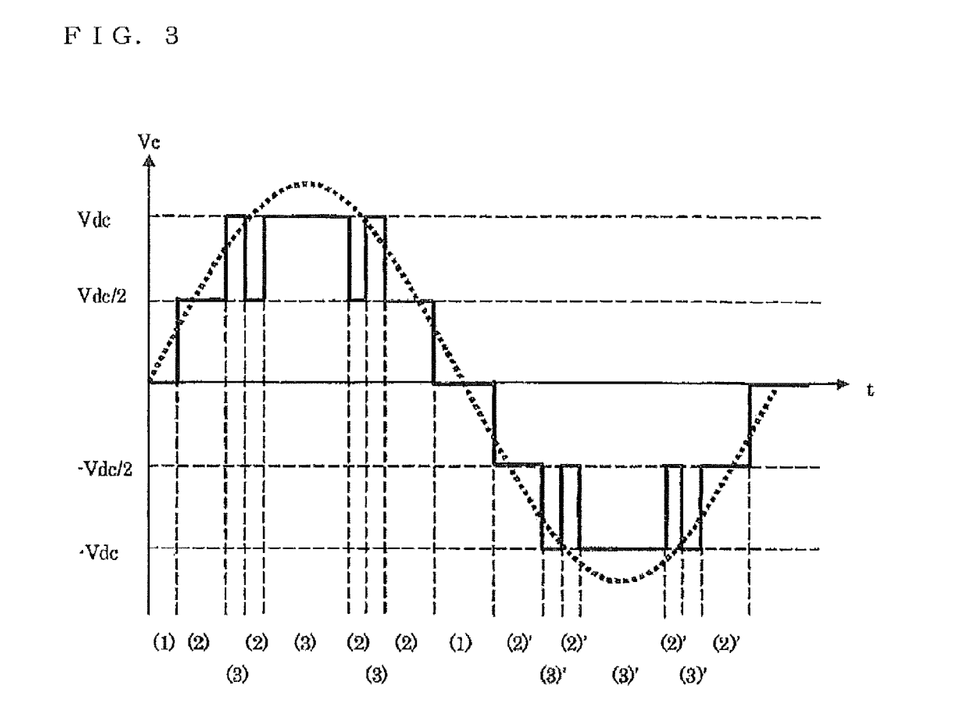
FIG. 3 illustrates a waveform of a voltage Vc between input terminals of a rectifier 2.

Since a reactor current I is an alternating current quantity, a circuit equation of FIG. 3 is represented by the following (Equation 1):

[Equation 1]

$$j\omega L I = V_s - V_c \quad \text{(Equation 1)}$$

where
ω: angular frequency
L: inductance of the reactor 5
j: imaginary number
Vs: voltage of the alternating current power supply 1
Vc: voltage of the virtual alternating current power supply 9.

The voltage Vs of the alternating current power supply 1 and the voltage Vc of the virtual alternating current power supply 9, both of which are assumed to be sinusoidal, are represented by the following (Equation 2) and (Equation 3):

[Equation 2]

$$V_s = \sqrt{2} \cdot V_1 \cdot \sin(\omega t) \quad \text{(Equation 2)}$$

$$V_c = \sqrt{2} \cdot V_2 \cdot \sin(\omega t - \phi) \quad \text{(Equation 3)}$$

where

φ: phase difference between Vs and Vc.

If it is assumed that V1=V2, the reactor current I is represented by the following (Equation 4):

[Equation 3]

$$I = \frac{1}{j\omega L} \cdot 2 \cdot \sin\left(\frac{\phi}{2}\right) \cdot \cos\left(\omega t - \frac{\phi}{2}\right). \quad \text{(Equation 4)}$$

If there is no change in the phase difference φ between Vs and Vc, sin (φ/2) is a constant. If it is assumed that a constant part of (Equation 4) is collectively denoted by K, the reactor current I is represented by the following (Equation 5):

[Equation 4]

$$I = -j \cdot K \cdot \cos\left(\omega t - \frac{\phi}{2}\right). \quad \text{(Equation 5)}$$

As described above, the circuit equation of FIG. 3 has been represented using the voltage Vc of the virtual alternating current power supply 9.

The above (Equation 5) provides the following finding.

That is, when the voltage Vc of the virtual alternating current power supply 9 is output in a sinusoidal form as represented by Equation 3, the reactor current I, which is an input current, will be sinusoidal. Accordingly, a harmonic current is controlled.

When the phase difference between the input current and the alternating current power supply 1 becomes zero, a voltage source power factor becomes 100%.

Thus, the harmonic waves of the input current can be controlled and the power factor can be improved by appropriately controlling the voltage amplitude V2 of the virtual alternating current power supply and the phase difference φ and outputting the sinusoidal voltage Vc.

Thus, in Embodiment 1, the first switching means 3 and the second switching means 4 are driven and controlled such that the voltage Vc between the input terminals of the rectifier 2 becomes substantially sinusoidal.

Hereinafter, operations of the first switching means 3 and the second switching means 4 to make the voltage Vc substantially sinusoidal will be described.

FIG. 3 illustrates a waveform of the voltage Vc between the input terminals of the rectifier 2.

The voltage Vc takes three-level output states of 0, Vdc/2 and Vdc as illustrated in FIG. 3 as a result of the operations of the first switching means 3 and the second switching means 4. The same applies to the opposite polarity. Vdc is an output direct current voltage applied to the direct current load 8.

The operations of the first switching means 3 and the second switching means 4 when the voltage Vc takes three-level output states will be described with reference to the following FIG. 4.

Figure 4:
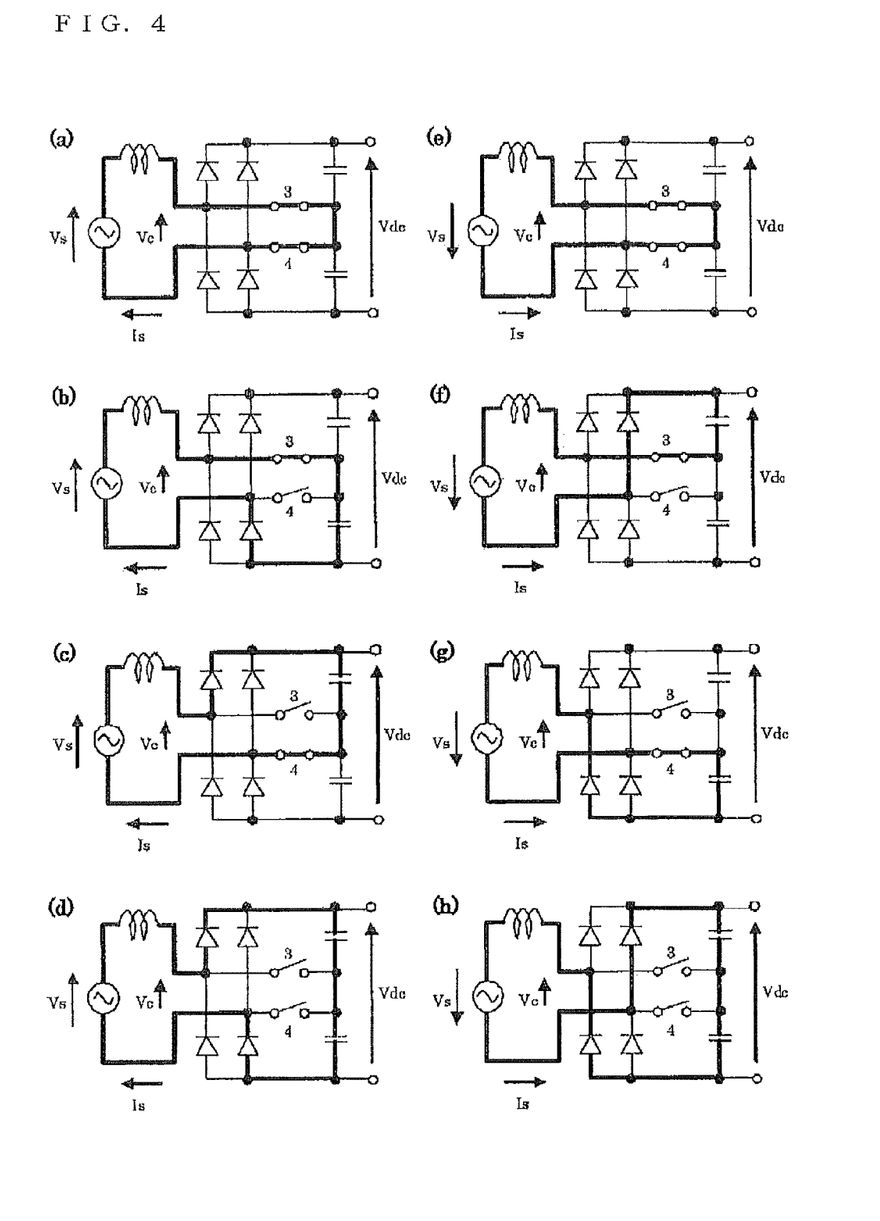
FIG. 4 illustrates operations of a first switching means 3 and a second switching means 4.

FIG. 4 illustrates operations of the first switching means 3 and the second switching means 4. Hereinafter, each switching state of FIG. 4 will be described.

(a) Both the first switching means 3 and the second switching means 4 are ON

In the state of FIG. 4(a), both the first switching means 3 and the second switching means 4 are ON. In this state, a short circuit has been established between the input terminals of the rectifier 2 and thus the voltage Vc=0. A section (1) in FIG. 3 corresponds to this state.

(b) The first switching means 3 is ON and the second switching means 4 is OFF

In the state of FIG. 4(b), the first switching means 3 is ON and the second switching means 4 is OFF. In this state, the voltage Vc between the input terminals of the rectifier 2 is equivalent to terminal voltages of the second capacitor 7.

Thus, the voltage Vc is half the output direct current voltage Vdc and thus Vc=Vdc/2. A section (2) in FIG. 3 corresponds to this state.

(c) The first switching means 3 is OFF and the second switching means 4 is ON

In the state of FIG. 4(c), the first switching means 3 is OFF and the second switching means 4 is ON. In this state, the voltage Vc across the input terminals of the rectifier 2 is equal to the terminal voltages across the first capacitor 6.

Thus, the voltage Vc is half the output direct current voltage Vdc and thus Vc=Vdc/2. A section (2) in FIG. 3 corresponds to this state.

(d) Both the first switching means 3 and the second switching means 4 are OFF

In the state of FIG. 4(d), both the first switching means 3 and the second switching means 4 are OFF. In this state, the rectifier 2 enters a full-wave rectification state.

Thus, the voltage Vc between the input terminals of the rectifier 2 is equivalent to the terminal voltages of the first capacitor 6 and the second capacitor 7 and thus the voltage Vc=Vdc. A section (3) in FIG. 3 corresponds to this state.

With each switching means driven and controlled as illustrated in FIGS. 4(a) to 4(d), the voltage Vc between the input terminals, i.e., the converter voltage Vc, of the rectifier 2 can adopt three-level voltage states.

With the timing for the three-level voltage states controlled appropriately, a voltage waveform of the sections (1) to (3) of FIG. 3 can be generated and thus Vc can be output in a substantially sinusoidal form.

FIGS. 4(e) to 4(h) are similar to FIGS. 4(a) to 4(d) except for the inverted polarity of the alternating current power supply 1. FIGS. 4(e) to 4(h) correspond to sections (1)' to (3)' of FIG. 3.

The operations of the first switching means 3 and the second switching means 4 to make the voltage Vc substantially sinusoidal has been described above.

As described above, it is intended in Embodiment 1 to reduce a switching frequency and control the harmonic current, thereby providing a more compact reactor 5 by making the number of output voltage levels (i.e., three voltage levels of 0, Vdc/2 and Vdc) be greater than that of the related art.

For the convenience of the explanation, a detailed operation of the control means 20 will be described in Embodiment 2.

As described above, according to Embodiment 1, the first switching means 3 and the second switching means 4 can be driven and controlled as illustrated in FIGS. 3 and 4 and the voltage Vc between the input terminals, i.e., the converter voltage Vc, of the rectifier 2 can be output in a substantially sinusoidal form of three voltage levels.

Thus, a more compact reactor 5 can be provided with a low switching frequency as compared with the related art technique in which the switching means is operated once or several times with respect to a half cycle of the power supply.

According to Embodiment 1, since a greater number of output voltage levels are provided, PWM control for performing driving and control at a low switching frequency of, for example, about 1 kHz to 5 kHz, can be performed.

Thus, an increase in cost of addressing a problem of a noise in, for example, high frequency PWM control can be suppressed.

This is because the input current can be controlled to be substantially sinusoidal simply by outputting the converter voltage Vc in a sinusoidal form without any control of the input current. That is, since no control of the input current control is performed, the need for a high frequency control operation is eliminated.

Embodiment 2

In Embodiment 1, it has been described that the input current is made substantially sinusoidal by outputting the converter voltage Vc in a substantially sinusoidal form, whereby the harmonic is controlled.

In Embodiment 2 of the present invention, a control block of the control means 20 will be described in detail. The circuit configurations are the same as those described in Embodiment 1.

Figure 5:
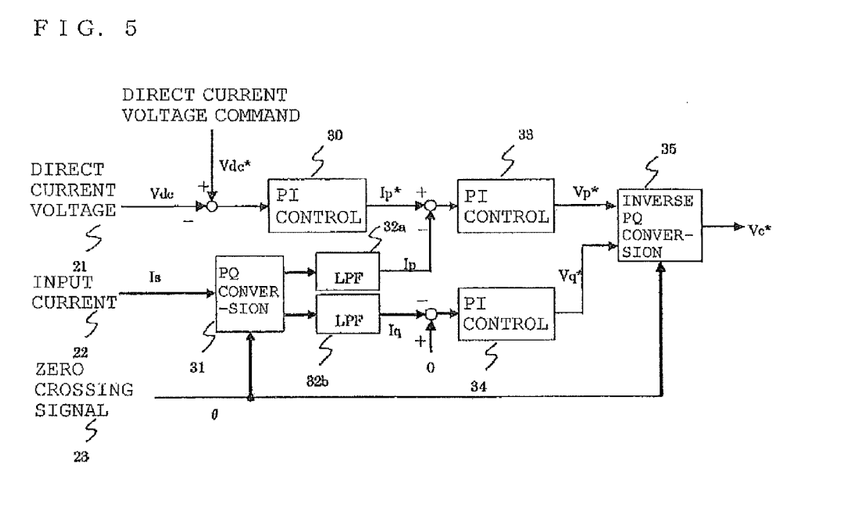
FIG. 5 is a block diagram illustrating an internal configuration of a control means 20.

FIG. 5 is a block diagram illustrating an internal configuration of a control means 20. The control block of FIG. 5 is an example of a control configuration which generates a PWM without instantaneously comparing an instantaneous value of the input current with a sinusoidal command value. Hereinafter, a configuration of FIG. 5 will be described.

A PI controller 30 receives a difference between the direct current voltage Vdc detected by the voltage detector 21 and a direct current voltage command value Vdc* which is a predetermined value which is set in advance, and executes a PI control calculation such that Vdc becomes close to Vdc*. A control command is output as a p-axis current command value Ip*.

A PQ converter 31 receives an instantaneous value Is of the input current detected by the current detector 22 and a power supply phase θ detected by the power supply zero cross detector 23 and separates, using these values, the instantaneous value Is of the input current into an active power component (a p-axis component) Ip and a reactive power component (a q-axis component) Iq of the input current and output the separated components.

Here, a supplemental explanation about a PQ conversion will be given below.

Although the PQ conversion is typically used in converting, for example, a three-phase current into a biaxial current, the PQ conversion is used in Is which is a single-phase current in Embodiment 2.

If the three-phase current is converted into a pq-axis current, an active component and a reactive component can be taken out as instantaneous values.

It is known, however, that if the PQ conversion is applied to the single-phase current, a conversion result will pulsate at twice the frequency of that of the alternating current power supply 1 (e.g., Japanese Unexamined Patent Application Publication No. 1-174274), Thus, the instantaneous value of the pq-axis current cannot be directly applied to the single-phase current control.

Thus, in Embodiment 2, in order to remove the pulsation at twice the frequency of that of the alternating current power supply 1, low pass filters (LPFs) 32a and 32b are applied to an output of the pq converter 31. With this, the pulsation included in the PQ conversion result can be removed and an appropriate control calculation can be executed.

Outputs of the LPFs 32a and 32b become an active power component current Ip and a reactive power component current Iq of Is which is a single-phase current.

Since the reactive power component Iq becomes 0 when the source power factor becomes 100%, the output of the PI controller 30 which controls the direct current voltage Vdc to the command value Vdc* should become the command value Ip* itself of the active power component current.

Then, a difference with the active power component current Ip is input to the PI controller 33 and the control calculation is executed such that the output of the PI controller 30 becomes Ip* itself. Similarly, since the reactive power component current Iq should also become 0, the difference of Iq and 0 is input to the PI controller 34 and the control calculation is executed.

The outputs of the PI controller 33 and the PI controller 34 are a voltage command Vp* of the active power component and a voltage command Vq* of the reactive power component. An inverse pq converter 35 performs an inverse PQ conversion of these command values using the power supply phase θ.

As a result, the source power factor becomes 100%, i.e., the reactive power component of the current becomes 0. In addition, a command value Vc* of the terminal voltages of the virtual alternating current power supply 9 which becomes the previously set direct current voltage is obtained.

A PLL (phase locked loop) circuit or other circuits may be used in order to synchronize the phase angle θ with the phase of the alternating current power supply 1. With this, precision in the phase angle θ can be improved and the harmonic current can be further reduced.

With the procedure described above, the command value Vc* of the converter voltage can be determined.

As a technique for determining the ON/OFF timing of the first switching means 3 and the second switching means 4 in accordance with the determined command value Vc* of the converter voltage, a typical unipolar modulation can be used, for example.

Figure 6:
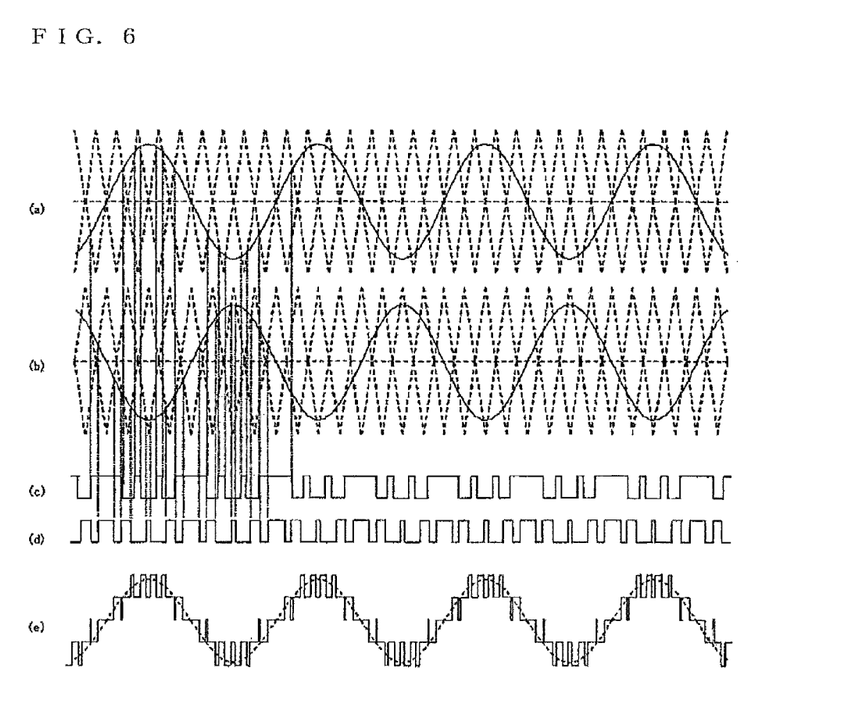
FIG. 6 is a waveform chart of a modulation signal which determines ON/OFF timing of each switching means.

FIG. 6 is a waveform chart of a modulation signal which determines ON/OFF timing of each switching means. Hereinafter, FIG. 6 will be described.

FIG. 6(a) is a modulation signal of the first switching means 3 and FIG. 6(b) is a modulation signal of the second switching means 4. Sinusoidal waveforms in FIGS. 6(a) and 6(b) are converter voltage command values Vc*.

Since an absolute value at a negative electrode side is in agreement with that of a positive electrode side, it can be said that the modulation signals in FIGS. 6(a) and 6(b) comply with a unipolar modulation method.

In FIG. 6(a), the first switching means 3 is turned OFF in a section in which the converter voltage Vc* is larger than a triangular wave which is a carrier wave.

FIG. 6(c) illustrates the ON/OFF timing of the first switching means 3. An upper side corresponds to turning ON and a lower side corresponds to turning OFF.

Since the second switching means 4 becomes a negative side to the converter voltage command value Vc*, the waveform of the modulation signal is that illustrated in FIG. 6(b) having a 180 degrees inverted phase of that of FIG. 6(a).

A waveform of FIG. 6(d) which is the ON/OFF timing of the second switching means 4 is obtained in the same manner as in FIG. 6(c).

The converter voltage command value Vc* is also obtained by adding the waveforms of FIGS. 6(c) and 6(d). However, since the upper side corresponds to turning ON of the switching means in FIGS. 6(c) and 6(d), the addition is made with the upper side being 0 and the lower side being 1 for the ease of the explanation.

Then, a chopped converter voltage command value Vc* illustrated in FIG. 6(e) is obtained.

As described above, the ON/OFF timing of the first switching means 3 and the second switching means 4 can be determined in accordance with the converter voltage command value Vc* through the application of the unipolar modulation.

Figure 7:
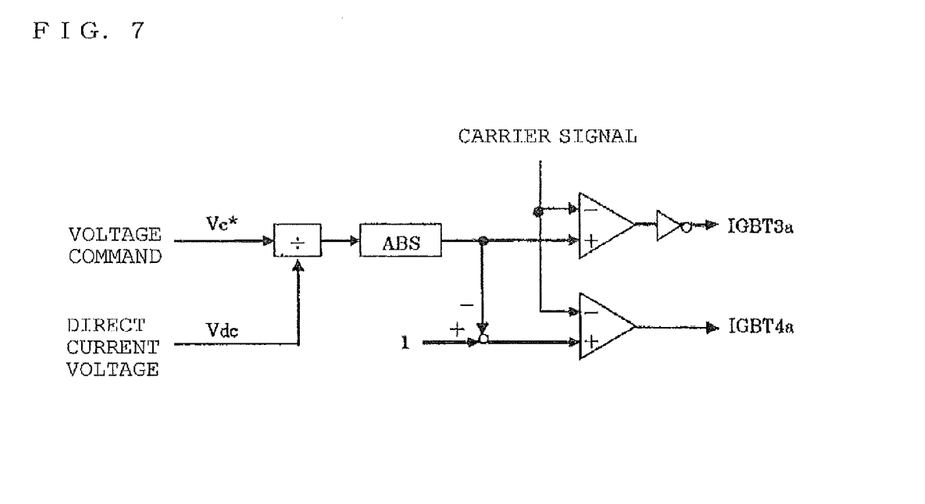
FIG. 7 illustrates an example of a control block diagram which implements the above-described PWM control.

FIG. 7 illustrates an example of a control block diagram which implements the above-described PWM control. With the control block illustrated in FIG. 5, driving signals for the IGBTs 3a and 3b can be generated and the PWM control described above can be implemented.

The modulation system for the determination of the ON/OFF timing of the first switching means 3 and the second switching means 4 has been described above.

As described above, in Embodiment 2, the converter voltage Vc between the input terminals of the rectifier 2 becomes a three-level chopping voltage as illustrated in FIG. 6(e) through the PWM operation of the first switching means 3 and the second switching means 4. When chopping voltage is filtered, a substantially sinusoidal waveform voltage is obtained.

Since the chopping voltage has three stages, a voltage resolution is increased as compared with a two-stage chopping waveform. Thus, under the same voltage resolution, the carrier frequency of the PWM can be further reduced.

In Embodiment 2, the PWM control is not executed by comparing the instantaneous value of the input current Is with the sinusoidal input current command value and making these values become close to each other, but the control illustrated in FIG. 5 is executed.

That is, under the assumption that the output of the PI controller 30 becomes Ip* when the source power factor is 100%, the comparison is made with the direct current voltage Vdc indirectly via the PI controller 30 without any comparison between the sinusoidal input current command value and the instantaneous value Is.

Thus, since the control is not executed while always comparing the changing instantaneous value Is and the command value, no high speed calculation process is needed and thus the current control can be implemented in a low speed arithmetic process.

Although it becomes difficult to, perform the instantaneous current control as described above when the single-phase power supply undergoes the PQ conversion, this problem is addressed by the circuit configuration with the converter voltage Vc of three voltage levels and thus the current control with the low frequency PWM is achieved in Embodiment 2.

Thus, the current control which typically requires a high frequency PWM 15 kHz to 20 kHz or greater can be implemented by, for example, low frequency PWM control of about 1 kHz to 5 kHz.

Thus, an increase in cost of addressing a problem of a noise caused by the high frequency PWM control can be suppressed and a practical application can be achieved at reduced costs.

The control technique of Embodiment 2 can be considered as a technique for achieving a desired output voltage and the power factor of 1 by feeding the output direct current voltage Vdc back to the control means 20 to drive and control each switching means.

In this regard, a technique of controlling a switching means at operation timing which is obtained in advance through a calculation is described in the above-mentioned Nonpatent Document 1.

Since the ON/OFF timing of the switching means can be set infinitely in accordance with the phase angle, the number of candidates of solution obtained by the calculation is infinite. Under this assumption, it has been practically very difficult to obtain the ON/OFF timing to make the output direct current voltage Vdc a desired value.

Then, a technique of seeking the optimum ON/OFF timing using GA is proposed in Nonpatent Document 1.

However, no technique has been found yet to seek the ON/OFF timing at which the output direct current voltage Vdc can be set to a desired value in addition that the harmonic can be controlled.

In addition, such a technique for seeking the optimum solution from among the infinite number of ON/OFF timing candidates is difficult to be put into a practical application in products with varying load conditions for the operation and products with multiple models.

Since the ON/OFF timing is determined by the feedback control, not by a calculation, in Embodiment 2, a practical application is easy even for, products with varying load conditions for the operation and products with multiple models.

Embodiment 3

Figure 8:
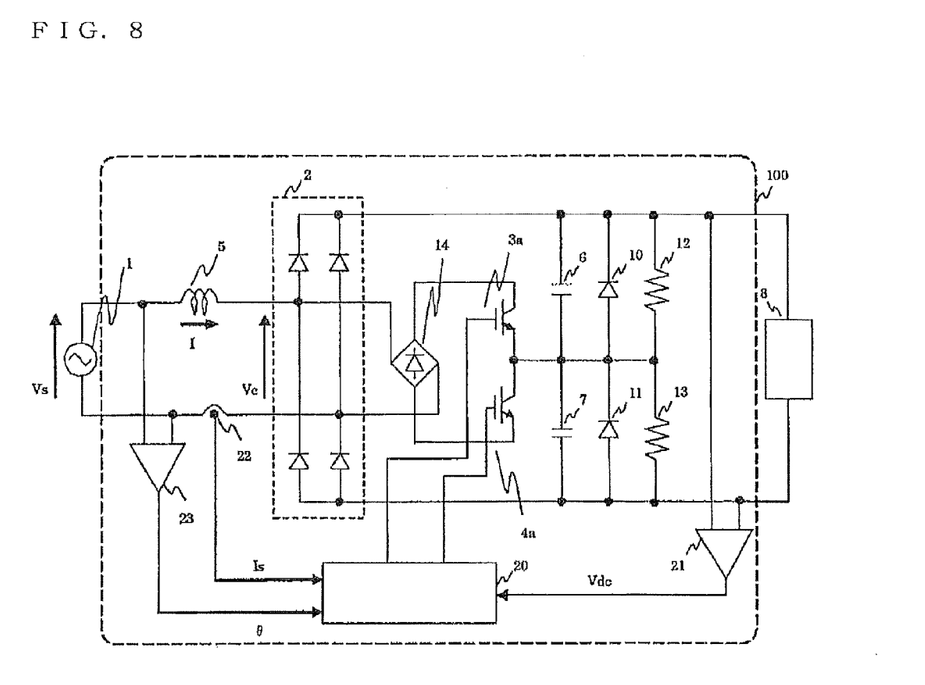
FIG. 8 is a circuit diagram of an alternating-current direct-current converter 100 according to Embodiment 3.

FIG. 8 is a circuit diagram of an alternating-current direct-current converter 100 according to Embodiment 3 of the present invention.

In the circuit of FIG. 8, a configuration of the switching means is changed from the circuit configuration of FIG. 1. Other configurations are the same as those of FIG. 1.

A "first rectifier" and a "second rectifier" in Embodiment 3 correspond to the rectifier 2.

In the circuit of FIG. 8, IGBTs 3a and 4a, which are unidirectional conduction switching elements, can perform operations equivalent to those of the bidirectional switching means illustrated in FIG. 1 through a function of the diode rectifier 14.

Thus, the same control operation as those described in Embodiments 1 and 2 can be performed in the circuit configuration of FIG. 8.

With the circuit configuration illustrated in FIG. 8, since the number of diodes through which a current flows when the IGBTs 3a and 4a are turned ON is half of the number of the diodes in FIG. 1, a conduction loss of the diodes can be reduced to a half of that of the circuit configuration of FIG. 1.

Accordingly, conversion efficiency of the alternating-current direct-current converter 100 can be improved.

The configuration of the alternating-current direct-current converter 100 according to Embodiment 3 has been described above.

Next, a first diode 10 and a second diode 11 will be described.

In a normal state in which the first capacitor 6 and the second capacitor 7 which are connected in parallel with each other have electric charge and have a positive voltage, the first diode 10 and the second diode 11 are not conducted and are in the OFF state, and thus are synonymous with being not connected.

However, in a state in which no voltage is supplied from the alternating current power supply 1 and power consumption in the direct current load 8 is not 0, the electric charge of the first capacitor 6 and the second capacitor 7 is eliminated.

At this time, the direct current load 8 consumes the electric charge uniformly from the first capacitor 6 and the second capacitor 7 which are connected in series. If the first capacitor 6 and the second capacitor 7 are not of the same capacitance, the electric charge remains in one of the capacitors even after the electric charge of the other is consumed and thus the output direct current voltage Vdc does not become 0.

Since the direct current load 8 continues consumption of the electric charge until the output direct current voltage Vdc becomes 0, a charge amount of the capacitor of which electric charge has been consumed earlier becomes negative and thus a negative voltage is applied.

However, an application of the negative voltage to an electrolytic capacitor having a voltage polarity is not allowed.

Then, it is suppressed that an application amount of the negative voltage exceeds an amount of forward voltage drop of the diode by connecting the first diode 10 and the second diode 11 in inversely parallel with each capacitor.

With this, a failure of the capacitor can be prevented and reliability can be improved. It is to be added that this effect is produced also in Embodiments 1 and 2.

Embodiment 4

In Embodiment 4 of the present invention, the control of an incoming current and a method of starting the operation of the alternating-current direct-current converter 100 therefor will be described.

When both the first switching means 3 and the second switching means 4 are OFF and the direct current load 8 is consuming electric power, a current is flowing through each capacitor in a full-wave rectification state as illustrated in FIG. 4(d).

In this state, when the first switching means 3 and the second switching means 4 are turned ON, a charging current flows through the first capacitor 6 and the second capacitor 7. The charging current becomes a large inrush current upon starting the alternating-current direct-current converter 100.

This large current is considered to be an inrush current generated when any one of the first switching means 3 and the second switching means 4 is turned ON and thereby the rectification state is changed from the full-wave rectification state to a voltage-doubler rectification state.

Since the large incoming current flowing upon starting the alternating-current direct-current converter 100 causes stresses on each section, such as each switching means and the rectifier 2, of the alternating-current direct-current converter 100, it is preferable to control the incoming current as much as possible.

A technique of controlling the incoming current will be described with reference to FIG. 2.

An input current 1 from the alternating current power supply 1 is determined by a difference voltage between the alternating current power supply 1 and the virtual voltage source 9. It is therefore obvious that, if the voltage of the virtual voltage source 9 is higher than that of the alternating current power supply 1 upon starting the operation of each switching means, no incoming current flows.

Then, in Embodiment 4, the control means 20 controls such that the voltage command Vc* output from the control block illustrated in FIG. 5 becomes higher than the voltage of the alternating current power supply 1 and that the phase is the same as that of the alternating current power supply 1 upon starting the drive control of the first switching means 3 and the second switching means 4.

Since the PI control is used in the control means 20, integration of the PI control is used as a technique for implementing the above-described control.

The control means 20 sets, as an initial value of an integrator, a value such that the voltage command Vc* becomes higher than the voltage of the alternating current power supply 1 and the phase is the same as that of the alternating current power supply 1.

With this, no incoming current flows upon starting the operation of each switching means and thus a soft starting can be achieved.

In particular, if a q-axis voltage command Vq* is set to 0, the voltage command Vc* enters the same phase with the alternating current power supply 1. In addition, if the p-axis voltage command Vp* of the voltage command Vc* is higher than Vs, a voltage higher than that of the alternating current power supply 1 can be output as Vc*.

Although not illustrated, since the voltage of the alternating current power supply 1 fluctuates, it is also possible to detect the voltage of the alternating current power supply 1 and set a value greater than the detected voltage as the p-axis voltage command Vp*. Alternatively, a voltage obviously higher than a rated voltage, e.g., a voltage of 1.3 to 1.5 or more times of 200V may be set. Needless to remark, an equivalent effect can be obtained in either method.

The technique of controlling the incoming current has been described above.

Next, a technique of controlling a rapid increase in the output direct current voltage will be described.

Upon starting the alternating-current direct-current converter 100, the phase difference φ between the converter voltage Vc and the voltage Vs of the alternating current power supply 1 is reset to 0 and the output direct current voltage Vdc is increased after the starting of the alternating-current direct-current converter 100.

Since the phase difference φ is preferably delayed in order to increase the output direct current voltage Vdc, the control is performed to delay the phase difference φ after the starting of the alternating-current direct-current converter 100. At this time, the output direct current voltage may increases rapidly and hunting may occur in the control system in some cases.

Thus, in Embodiment 4, the phase difference φ is set toward a leading phase (e.g., −10 degrees) upon starting the alternating-current direct-current converter 100. In particular, the control means 20 outputs the voltage command Vc* such that, for example, the reactive power component current of the input current becomes 0 or smaller.

With this, either the direct current load 8 is a light load or a heavy load, a rapid increase in the output direct current voltage after the starting can be controlled and a soft starting can be achieved.

Alternatively, the control means 20 may execute the control such that the direct current voltage command value Vc* increases gently. Also in this case, similarly, a rapid increase in the output direct current voltage after the starting can be controlled and a soft starting can be achieved.

Embodiment 5

Figure 9:
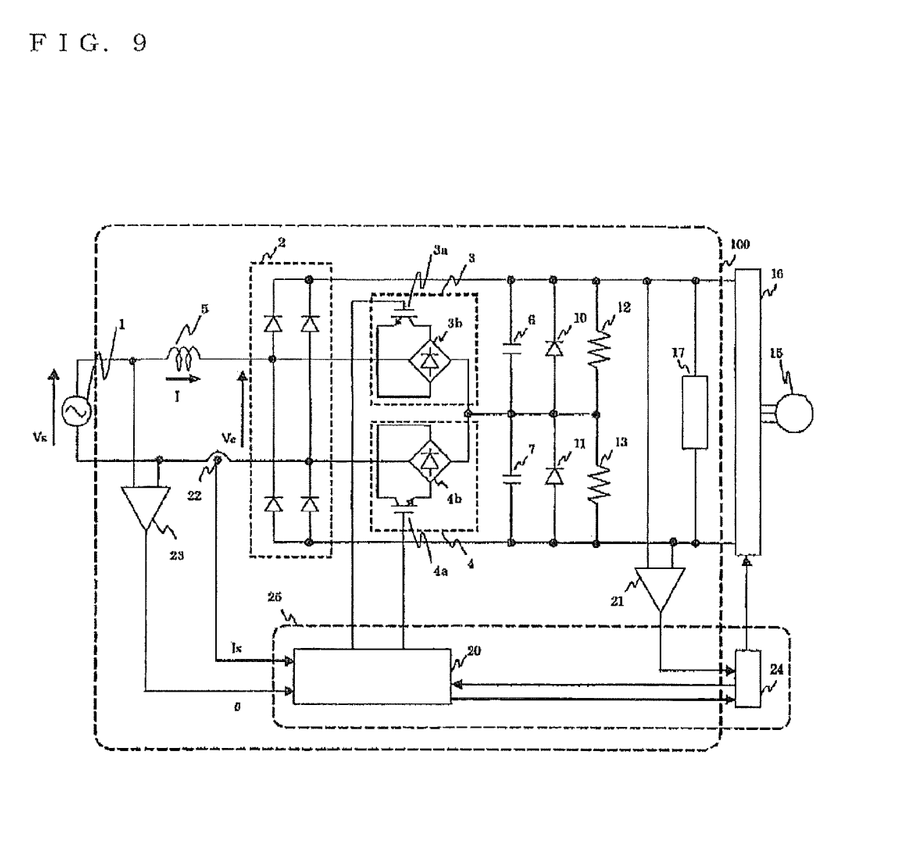
FIG. 9 is a circuit diagram of an alternating-current direct-current converter 100 according to Embodiment 5.

FIG. 9 is a circuit diagram of an alternating-current direct-current converter 100 according to Embodiment 5 of the present invention.

The circuit of FIG. 9 is a circuit in which the direct current load 8 in the circuit diagram illustrated in FIG. 1 of Embodiment 1 is replaced by an inverter 16 and a permanent magnet motor 15. A voltage clamp section 17 is provided in an output terminal of the alternating-current direct-current converter 100. An inverter control means 24 which controls an operation of the inverter 16 is also provided.

The inverter control means 24 may be formed using hardware, such as a circuit device that implements the function or, alternatively, may be formed using a semiconductor integrated circuit, such as a microcomputer or a CPU and software which defines an operation of the semiconductor integrated circuit.

The inverter control means 24 and the control means 20 may be formed using an arithmetic unit, such as a single CPU, and software which defines an operation of the arithmetic unit, and may be formed in an integrated manner.

Hereinafter, a description will be given under the assumption that the inverter control means 24 and the control means 20 are integrated with the CPU 25. In this case, the inverter control means 24 is integrated with a part of the alternating-current direct-current converter 100.

A technique for integrating the inverter control means 24 and the control means 20 with each other will be described later, An operation of the alternating-current direct-current converter 100 according to Embodiment 5 is substantially the same as those described in Embodiments 1 to 4. Especially, the replacement of the load by the inverter 16 and the permanent magnet motor 15 will be described below.

First, capability of providing additional degrees of freedom in the design of the electric motor by using the circuit of FIG. 9 as an electric motor driver will be described. Thereafter, a configuration of controlling an instantaneous abnormal voltage increase will be described, and then a technique for integrating the inverter control means 24 with the control means 20 will be described.

(1) Regarding Degree of Freedom in Design of an Electric Motor

With an electric motor, the lower the current necessary to output the same torque, the smaller the copper loss (a square of the resistance multiplied by the current).

For example, in the case of a permanent magnet synchronous motor, since the torque by the permanent magnet increases when an electromotive voltage constant of the electric motor is increased, the same torque can be output with a lower current.

In addition, as the current is reduced, an effect of reducing a conduction loss and a switching loss of the inverter which drives the electric motor will also be exhibited.

Accordingly, it can be said that increasing the electromotive voltage constant of the electric motor and reducing the current is the most effective as means to increase the efficiency.

When the electric motor is designed such that the efficiency becomes high at the time of low speed rotation with long operating time, such as in an electric motor used for an air conditioner, the electromotive voltage constant of the electric motor increases.

Since the voltage required at a certain number of rotations becomes high as the electromotive voltage constant becomes high in a case in which the electric motor undergoes a high-speed rotation for rapid cooling or rapid heating, the direct current voltage necessary for the inverter to drive the electric motor also increases.

In the past, there were restrictions in the design of the specification of the electric motor under the consideration of a relationship between the maximum number of rotations and the direct current voltage.

Although the efficiency of the electric motor can be increased by increasing the direct current voltage and making the electromotive voltage constant high as described above, the conversion efficiency of the alternating-current direct-current converter 100 will decrease when the output direct current voltage Vdc of the alternating-current direct-current converter 100 is increased in order to provide the high direct current voltage.

That is, a power factor of the alternating-current direct-current converter 100 decreases significantly and the harmonic current increases.

If the switching is performed several times during a half cycle of the power supply as in the techniques described in Patent Documents 3 and 4, only a small effect that the direct current voltage is increased by an amount of the voltage drop of the reactor 5 can be exhibited. If the direct current voltage is increased by a further amount, the power factor will decrease significantly and the harmonic current will increase.

From the reason described above, it has been difficult with the related art to provide a highly efficient electric motor driver even by increasing the direct current voltage and making the electromotive voltage constant high.

However, in the alternating-current direct-current converter 100 according to the present invention, since the control operation can be performed at a low carrier frequency, the output voltage is increased while the power factor is decreased such that a highly efficient conversion operation is performed as compared with the alternating-current direct-current converters in which the voltage is boosted as in the techniques described in Patent Documents 1 and 2.

This means that an energy saving effect can be exhibited effectively when the inverter 18 which drives the permanent magnet motor 15 is connected as the direct current load 8 of the alternating-current direct-current converter 100 of the present invention.

With this, when the electric motor is designed such that the efficiency becomes high during low speed operations, and is made to rotate at a high speed, the maximum number of rotations can be secured by increasing the output DC voltage of the alternating-current direct-current converter 100.

Accordingly, efficiency during low speed operations, i.e., during normal operations can be improved without any deterioration in performance of the air conditioner even during overload operations, such as rapid cooling and rapid heating.

Accordingly, when an electric motor driver which drives an electric motor with a high electromotive voltage constant is provided by the alternating-current direct-current converter 100 of the present invention, an operation efficiency of the whole electric motor driver is improved and a highly energy-saving product can be provided.

(2) Control of Instantaneous Abnormal Increase in Voltage

The permanent magnet motor 15 may stop due to, for example, a failure in the permanent magnet motor 15 or the inverter 16 or a noise.

In this case, at certain electromotive voltage constants of the permanent magnet motor 15, a voltage exceeding withstand pressure of the first capacitor 6 and the second capacitor 7 may be applied to each capacitor by the energy when the permanent magnet motor 15 is not in operation.

Then, the alternating-current direct-current converter 100 according to Embodiment 5 includes a voltage clamp section 17 which controls an instantaneous abnormal increase in voltage.

The voltage clamp section 17 can be formed using, for example, a surge damper, a surge absorber or a series circuit of a resistance and an IGBT. Other configurations capable of controlling an instantaneous power surge may also be used.

(3) Technique to Integrate Inverter Control Means 24 and Control Means 20

The control means 20 and the inverter control means 24 have different objects to be controlled and therefore may perform the PWM control at different carrier frequencies. In addition, a detection value detected by, for example, each detector may be used for the control of both the control means 20 and the inverter control means 24.

For example, the direct current voltage Vdc detected by the voltage detector 21 is used by both the inverter control means 24 and the control means 20.

When the detection value is taken into the CPU 25, it is necessary to detect at predetermined sampling timing. It is typically preferable that the predetermined sampling timing is in synchronization with the PWM timing.

That is, when the control means 20 and the inverter control means 24 perform the PWM control at the different carrier frequencies, it is considered to be preferable that the detection value is acquired at two different sampling timing in accordance with each of the frequencies.

However, when the two different sampling timing is provided for each of the control means 20 and the inverter control means 24, two terminals should be required to detect the same value, resulting in an increase in cost.

Then, in Embodiment 5, the CPU 25 is formed as follows.

The alternating-current direct-current converter 100 controls the direct current voltage Vdc in order to drive and control the permanent magnet motor 15. Then, in Embodiment 5, a detection value of the voltage detection means 21 is first input to the inverter control means 24.

The CPU 25 samples, at the timing at which the inverter control means 24 performs the PWM control, the detection value of the voltage detection means 21 and delivers it to the inverter control means 24.

The control means 20 acquires the detection value from the inverter control means 24 at the timing at which the control means 20 performs the PWM control.

With the technique described above, only a single terminal is required for the acquisition of the same detection value and thereby an increase in cost caused by having redundant terminals can be suppressed.

Supplying the detection value of the voltage detection means 21 to the inverter control means 24 first is based on the following reasons.

The inverter 16 drives the permanent magnet motor 15 in response to the application of the direct current voltage. That is, the detection value of the voltage detection means 21 is considered as a detection value of the input voltage for the inverter control means 24.

On the contrary, the detection value of the voltage detection means 21 is considered, for the alternating-current direct-current converter 100, as a result value of constant control by the alternating-current direct-current converter 100.

Accordingly, it is necessary on the time series of a regulator to supply the detection value to the inverter control means 24 first.

While the input current Is is a result of the operation of the motor 15 for the inverter 16, the alternating-current direct-current converter 100 uses the input current Is as the input value in the control calculation for an improvement in the power factor.

Thus, the CPU 25 acquires the detection value of the current detector 22 at the timing at which the control means 20 performs the PWM control. The inverter control means 24 acquires the detection value from the control means 20, With the technique described above, the detection value used for the control can be taken into the control of both the control means 20 and the inverter control means 24 on the basis of priority and necessity without any increase in the redundant detection ports of the CPU 25.

With this, the control means 20 and the inverter control means 24 can be integrated with a single semiconductor integrated circuit, such as the CPU 25, without any increase in cost and thereby a further cost reduction effect can be exhibited.

Embodiment 6

The alternating-current direct-current converter 100 described in Embodiments 1 to 5 can be used for electric power units for loads which consume direct current electric power.

For example, the alternating-current direct-current converter 100 can be applied to general home electronics, such as an air conditioner, a freezer, a washer/dryer, a refrigerator, a dehumidifier, a heat pump water heater, a showcase and a vacuum cleaner. In addition, the alternating-current direct-current converter 100 can also be applied to a fan motor, a ventilation fan and a hand drier.

The invention claimed is:

1. An alternating-current direct-current converter, comprising:
a rectifier connected to an alternating current power supply via a reactor;
two capacitors connected in series between output terminals of said rectifier;
a first switch connected between one input terminal of said rectifier and a connection point of said capacitors;
a second switch connected between the other input terminal of said rectifier and the connection point of said capacitors;
diodes inversely parallelly connected with said capacitors;
a voltage detector which detects terminal voltages of said capacitors;
a current detector which detects a current input from said alternating current power supply; and
control means which drives and controls said first switch and said second switch,
wherein said control means drives and controls said first switch and said second switch such that the terminal voltages of said capacitors are fixed and a power supply power factor is improved using an active power component and a reactive power component obtained by conversion of detection results of said current detector and detection results of said voltage detector.

2. An alternating-current direct-current converter, comprising:
a first rectifier connected to an alternating current power supply via a reactor;
a second rectifier connected in parallel to said first rectifier;
two capacitors connected in series between output terminals of said first rectifier;
two switches connected in series between output terminals of said second rectifier;
diodes inversely parallelly connected with said capacitors;
a voltage detector which detects terminal voltages of said capacitors;
a current detector which detects a current input from said alternating current power supply; and
control means which drives and controls said two switches,
wherein a connection point of said capacitors and a connection point of said switches are connected, and said control means drives and controls said first switch and said second switch such that the terminal voltages of said capacitors are fixed and a power supply power factor is improved using an active power component and a reactive power component obtained by conversion of detection results of said current detector and detection results of said voltage detector.

3. The alternating-current direct-current converter of claim 1, wherein said control means drives and controls said switches such that, during a half cycle of the alternating current power supply, said rectifiers takes four rectification states that are a full-wave rectification state, a first voltage-doubler rectification state, a second voltage-doubler rectification state, and a power supply short circuit state.

4. The alternating-current direct-current converter of claim 1, wherein said control means converts the detection result of said current detector into an active power component current and a reactive power component current and performs control such that the terminal voltages of said capacitors are fixed using said active power component current.

5. The alternating-current direct-current converter of claim 1, wherein said control means controls a power supply power factor using said reactive power component current.

6. The alternating-current direct-current converter of claim 1, wherein said control means includes means that removes a pulsation component which has twice the frequency of that of said alternating current power supply and which is included in said active power component current and said reactive power component current, and drives and controls said first switch and said second switch based on said active power component and said reactive power component from which said pulsation has been removed.

7. The alternating-current direct-current converter of claim 1, wherein said control means calculates a command value of an active power component voltage of the voltage between the input terminals of said rectifiers using said active power component current, calculates a command value of a reactive power component voltage of the voltage between the input terminals of said rectifiers using said reactive power component current, calculates a command value of the voltage between the input terminals of said rectifiers using these values, and drives and controls said first bidirectional switch and said second switch such that the voltage between the input terminals of said rectifiers becomes close to the command value.

8. The alternating-current direct-current converter of claim 1, wherein said control means performs control, upon starting the driving and controlling of said switches, such that the command value of the active power component voltage of the voltage between the input terminals of said rectifiers becomes higher than the voltage of said alternating current power supply.

9. The alternating-current direct-current converter of claim 1, wherein said control means performs control, upon starting the driving and controlling of said switches, such that the command value of the reactive power component voltage of the voltage between the input terminals of said rectifiers becomes 0.

10. The alternating-current direct-current converter of claim 1, wherein said control means outputs, upon starting the driving and controlling of said switches, a voltage command value of the voltage between the input terminals of said rectifiers such that the reactive power component of the input current becomes 0 or smaller.

11. An electric motor driver, comprising:
the alternating-current direct-current converter according to claim 1;
an inverter which converts direct current power output from said alternating-current direct-current converter into alternating current power and drives a permanent-magnet electric motor; and
inverter control means which controls an operation of said inverter,
wherein said control means and said inverter control means are implemented on a single semiconductor integrated circuit.

12. The electric motor driver of claim 1, wherein said semiconductor integrated circuit acquires detection results of said voltage detector in synchronization with PWM control timing executed by said inverter control means and acquires detection results of said current detector in synchronization with PWM control timing executed by said control means.

13. The alternating-current direct-current converter of claim 2, wherein said control means drives and controls said switches such that, during a half cycle of the alternating current power supply, said rectifiers takes four rectification states that are a full-wave rectification state, a first voltage-doubler rectification state, a second voltage-doubler rectification state, and a power supply short circuit state.

14. The alternating-current direct-current converter of claim 2, wherein said control means converts the detection result of said current detector into an active power component current and a reactive power component current and performs control such that the terminal voltages of said capacitors are fixed using said active power component current.

15. The alternating-current direct-current converter of claim 2, wherein said control means controls a power supply power factor using said reactive power component current.

16. The alternating-current direct-current converter of claim 2, wherein said control means includes means that removes a pulsation component which has twice the frequency of that of said alternating current power supply and which is included in said active power component current and said reactive power component current, and drives and controls said first switch and said second switch based on said active power component and said reactive power component from which said pulsation has been removed.

17. The alternating-current direct-current converter of claim 2, wherein said control means calculates a command value of an active power component voltage of the voltage between the input terminals of said rectifiers using said active power component current, calculates a command value of a reactive power component voltage of the voltage between the input terminals of said rectifiers using said reactive power component current, calculates a command value of the voltage between the input terminals of said rectifiers using these values, and drives and controls said first bidirectional switch and said second switch such that the voltage between the input terminals of said rectifiers becomes close to the command value.

18. The alternating-current direct-current converter of claim 2, wherein said control means performs control, upon starting the driving and controlling of said switches, such that the command value of the active power component voltage of the voltage between the input terminals of said rectifiers becomes higher than the voltage of said alternating current power supply.

19. The alternating-current direct-current converter of claim 2, wherein said control means performs control, upon starting the driving and controlling of said switches, such that the command value of the reactive power component voltage of the voltage between the input terminals of said rectifiers becomes 0.

20. The alternating-current direct-current converter of claim 2, wherein said control means outputs, upon starting the driving and controlling of said switches, a voltage command value of the voltage between the input terminals of said rectifiers such that the reactive power component of the input current becomes 0 or smaller.

* * * * *